United States Patent [19]

Abthoff et al.

[11] Patent Number: 4,704,863

[45] Date of Patent: Nov. 10, 1987

[54] EXHAUST GAS FILTER FOR DIESEL ENGINES

[75] Inventors: Joerg Abthoff, Pluederhausen; Hans-Dieter Schuster, Schorndorf; Gunter Loose, Remseck; Bernhard Jokl, Neuhausen, all of Fed. Rep. of Germany

[73] Assignee: Daimler-Benz Aktiengesellschaft, Stuttgart, Fed. Rep. of Germany

[21] Appl. No.: 810,766

[22] Filed: Dec. 19, 1985

[30] Foreign Application Priority Data

Jan. 16, 1985 [DE] Fed. Rep. of Germany ....... 3501182

[51] Int. Cl.$^4$ .............................................. F01N 3/02
[52] U.S. Cl. ..................................... 60/311; 55/487; 55/523; 55/DIG. 30; 422/180
[58] Field of Search ................... 60/311; 55/487, 523, 55/DIG. 30; 422/180.

[56] References Cited

U.S. PATENT DOCUMENTS

| | | | |
|---|---|---|---|
| 4,451,441 | 5/1984 | Ernest | 55/487 |
| 4,519,820 | 5/1985 | Oyobe | 422/178 |
| 4,576,799 | 3/1986 | Worner | 55/330 |
| 4,604,869 | 8/1986 | Yoshida | 60/311 |

FOREIGN PATENT DOCUMENTS

| | | |
|---|---|---|
| 1476627 | 4/1970 | Fed. Rep. of Germany . |
| 2951316 | 6/1981 | Fed. Rep. of Germany . |
| 3232729 | 3/1984 | Fed. Rep. of Germany . |
| 1327038 | 4/1963 | France ................................. 55/487 |

*Primary Examiner*—Douglas Hart
*Attorney, Agent, or Firm*—Barnes & Thornburg

[57] ABSTRACT

An exhaust gas filter for Diesel engines that consists of a monolithic filter block made of a porous ceramic material having a plurality of ducts extending in the flow direction of the exhaust gases, said ducts alternately being closed by plugs in order to force the passage of gas through the duct walls into adjacent ducts. In the case of this exhaust gas filter, the filter block is divided into zones having a decreasing porosity in the flow direction of the gases, and the plugs which force the passage of the gas through the duct walls are each arranged in the area of the zone border. Filters are preferred that have two to four zones of decreasing porosity. The exhaust gas filters are manufactured in that a filter blank that has the largest desired porosity is immersed in a solution or suspension of a porosity-reducing agent up to the desired zone border and is subsequently dried and is possibly burnt. Preferred agents for reducing the porosity are water glass solutions or cordierite suspensions.

16 Claims, 2 Drawing Figures

EXHAUST GAS FILTER FOR DIESEL ENGINES

BACKGROUND AND SUMMARY OF THE INVENTION

Exhaust gas filters for Diesel engines have the purpose of filtering soot out of the exhaust gas of Diesel engines. The emission of soot from Diesel engines is critical because the soot particles contain adsorbed at their surface small amounts of substances some of which in high concentrations are considered to be harmful to human health.

The soot filters for the Diesel exhaust gases conventionally consist of a monolith of a porous ceramic material which is constructed of thin-walled ducts that are parallel to one another and extend over the whole length of the monolith in the flow direction of the exhaust gases. These ducts are alternately closed at their upstream or downstream end. The ducts are frequently open or closed in the manner of a chessboard pattern, so that each duct has an open and a closed end. Another way to make filters of this type consists of winding the filter in a spiral shape in the manner of manufacturing a corrugated board, to form a gas-permeable packet. In this case, the individual ducts are no longer developed only in the manner of a chessboard, but are also arranged in a spiral shape.

When the Diesel exhausts are led through a filter of this type, the exhaust gas entering through the ducts that are open on the inlet side is forced to pass through the porous duct walls and flow into the adjacent ducts that are open on the outlet side. In this case, the soot particles that can no longer pass through the duct walls collect in the ducts that are open upstream. When a certain final ignition temperature is reached and when a sufficient oxygen concentration exists in the exhaust gas, the collected soot burns off and the filter is regenerated. However, it was found that the porosity of the conventional soot burning filters decreases as times goes on, so that a rising backpressure builds up in front of the filter leading to a reduction of power in the engine and an increase of fuel consumption.

The objective of the present invention consists of finding a process for manufacturing an exhaust gas filter for Diesel engines made of a porous ceramic material whereby the decrease of porosity as well as the rising counterpressure in front of the filter that occur over the working life of the filter can be reduced considerably.

This objective is achieved by means of having a multi-zoned filter having different porosities in each zone, as well as by a process for manufacturing an exhaust gas filter whereby the filter is partially immersed in a solution or suspension of a porosity-reducing agent to create the above zones.

The filter block contemplated in the invention consists of several zones along the length of the filter, where the porosity of the duct walls in each zone decreases from zone to zone in the main flow direction of the gases from the gas inlet to the gas outlet. In each case, plugs are alternately arranged at the border of the zones. On the side of the gas inlet, every other duct is closed by a plug. The gas enters into the ducts that are open, which ducts are subsequently closed by plugs at the border to the next zone which has a decreased wall porosity. As a result, the gas is forced to pass through the porous wall of the first zone having walls with a relatively large wall porosity and thus arrives in the second duct, which duct is subsequently closed by a plug at the start of the next zone which has a further decreased wall porosity. As a result, the gas flow is forced to pass through the less porous walls of the second zone. It is now possible, after the passage through two zones with different porosity, to let the gases out of the filter. It is also possible to connect additional zones with correspondingly reduced porosity so that the gas flow is filtered several more times through walls having a decreasing porosity. It was found in this case that the best results are achieved when the gas flow must pass through two to four zones with different porosity. In this case, the expense for the manufacturing the filters is disproportionately high.

The staggering of porosities should be carried out in such a way that in the last filtering step through the wall having the least porosity, and sufficient gas passage is possible without excessive backpressure. A staggering of porosities has been especially successful where, in the flow direction of the gases, each successive zone is decreased to about 70 to 90% of the porosity of the preceding zone, in which case the porosity of the last zone normally should not be below 40%. While the porosity of the ceramic material in the case of the conventional filters is between 35 and 55% with an average pore diameter of about 10 to 35 micrometers, in the case of the present filter, the porosity of the first filter step is selected to be larger, approximately in the range of a porosity of 50 to 75%, with a correspondingly larger average pore diameter.

An especially simple process for the manufacturing of this filter consists of starting with a conventional filter block blank, the porosity of which corresponds to the porosity of the first filter step and thus represents the largest used porosity. Starting with the outlet end of the filter, this filter block will now be immersed up to the level of the first zone in a solution or suspension of an agent which reduces the porosity and then dried. The consistency or concentration of this agent must be selected to be such that, after the drying or possible required burning-in, the desired porosity of the part of the filter that was immersed is obtained. The porosity reducing characteristics of the corresponding agents must be able to determined easily beforehand by means of tests. If the filter is to have more than two zones, the filter may be immersed again, up to the level of the additional zone border, in the same or a different suspension or solution. The use of the same solution is suitable when the filter is dried before the second immersion, while the use of another solution is advantageous when the filter, without any intermediate treatment, i.e., still moist from the first immersion process, is subjected to the second immersion process. It may also be necessary to immerse the filter several times in a corresponding suspension or solution, if the desired reduction of porosity in a zone cannot be obtained by means of one immersion process.

All solutions and suspensions of porosity-reducing agents that can withstand the later operational temperature of the filter block and are correspondingly abrasion-proof with respect to the gas flow may be used. For this purpose, only essentially inorganic substances can be used. Because they are easy to handle, water glass solutions have proven to be especially useful. In the case of higher demands on the temperature stability, slurries or suspensions of materials resistant to high temperatures were also found to be useful, especially materials that are also used for the manufacturing of the filter, such as cordierite or china clay/feldspar/quartz mixtures. If necessary, these suspensions may also contain an inorganic binding agent, such as a small quantity of water glass. It is advantageous to adjust the concentration of the suspension or solution in such a way that with a single immersion, the desired reduction of porosity by 10 to 30% can be achieved after the drying and possible burning-in of the blank.

As soon as the filter block blank is provided with the desired number of zones having duct walls with decreasing porosity along the length of the filter in the flow direction, the corresponding alternately arranged plugs, at the filter inlet, at the zone borders and at the filter outlet, may be arranged in the ducts. At the filter inlet and at the filter outlet, this takes place by conventional methods. Inside the filter at the zone borders, this placement may take place by pressing out a pasty sealing mass consisting, for example, of a mass of talc and water glass, and inserting the mass into the filter duct at the corresponding zone border by means of a hollow needle, thereby closing the duct at this point.

Other objects, advantages and novel features of the present invention will become apparent from the following detailed description of the invention when considered in conjunction with the accompanying drawings.

BRIEF DESCRIPTION OF THE DRAWINGS

The drawings, in diagram form, show two embodiments of an exhaust gas filter according to the invention.

DETAILED DESCRIPTION OF THE DRAWINGS

Figure 1:
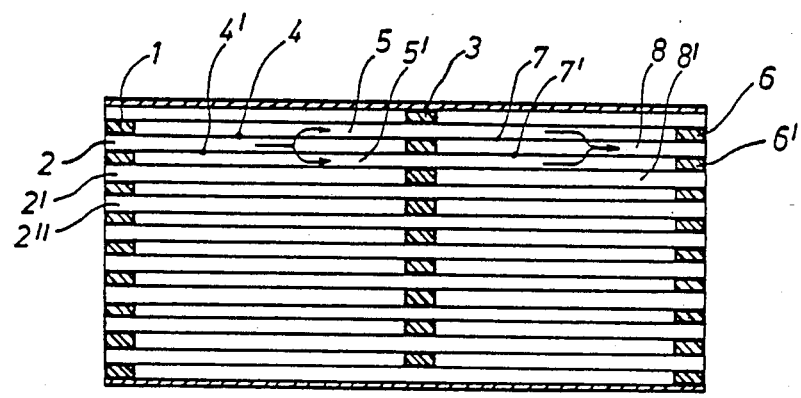
FIG. 1 is a longitudinal sectional view through an exhaust gas filter formed by two zones.

In the case of the filter shown in FIG. 1, the gas flows through the filter from the left to the right. On the side of the inlet, every other duct is closed by a first row 1 of plugs. The exhaust gas flows into the open ducts 2, 2′, 2″, etc., and by means of the row 3 of the plugs by which the ducts 2, 2′, 2″, etc., are closed, is forced to flow through the porous walls 4, 4′, etc., into the ducts 5, 5′, etc. In the ducts 5, 5′, etc., the exhaust gas now flows a distance until it encounters the plugs 6, 6′, etc., inserted at the outlet side, whereupon the gas is forced to enter the ducts 8, 8′, etc., through the porous walls 7, 7′, etc., the exhaust being able to leave the filter through said ducts 8, 8′, etc. The path of the gas is shown in diagram form in FIG. 1 by means of arrows drawn into the ducts. The porosity of the walls 4, 4′, i.e. therefore of the first filter zone, is 70%, while the porosity of the walls 7, 7′, i.e., of the second filter zone, is 50%.

Figure 2:
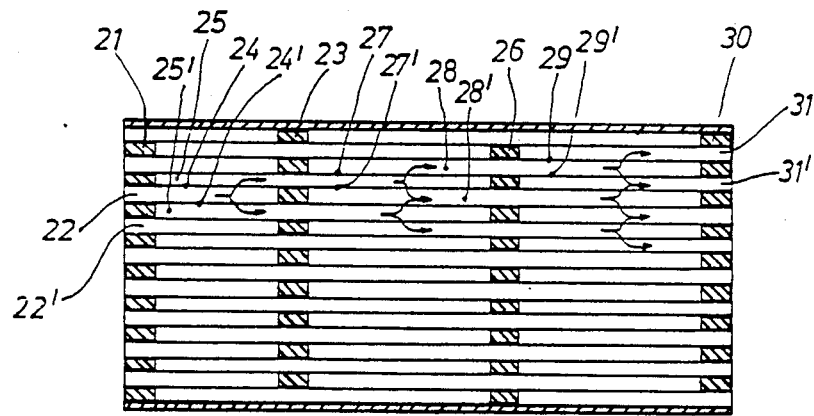
FIG. 2 is a sectional view through an exhaust gas filter consisting of three zones.

FIG. 2 shows an exhaust gas filter with three different zones. At the inlet of the filter, every other duct again is closed by a row 21 of plugs. The exhaust gas enters the ducts 22, 22′, etc., is forced by the row 23 of plugs located at the first zone border to enter the ducts 25, 25′, etc., through the porous walls 24, 24′, etc., of the first zone. By means of the third row 26 of plugs, the exhaust gas is forced to enter the ducts 28, 28′, etc., through the porous walls 27, 27′, etc., of the second zone. The ducts 28, 28′, etc., at the filter end, are closed by the row 30 of plugs so that the gas is again forced to enter the ducts 31, 31′, etc., through the porous walls 29, 29′, etc., of the third zone, the gas being able to leave the filter from these ducts 31, 31′. The filter is constructed in this case in such a way that the porosity of the first zone is at about 70%, the porosity of the second zone is at 60%, and the porosity of the third zone is at 50%. As also shown in FIG. 2, the individual zones may have different sizes in order to be able to adapt them to different conditions.

Tests have shown that the porosity of a conventional soot burning filter, i.e., a filter having only one filter zone, having a filter length of 6 inches and an initial porosity of 50%, over a period of 20,000 miles of exhaust gas flow, is reduced as follows: The porosity decreases in the range of two inches from the outlet plug to 45%; in the range of four inches from the outlet plug to 40%, and in the range six inches from the outlet plug to 30%. That is, the porosity decreases the most in the area of the gas inlet. The overall porosity of the filter is therefore reduced from 50% to about 38.3%, resulting in a considerable rise in backpressure.

For a filter according to the invention having the same dimensions that is divided into two equally large zones of 70% and 50 porosity, the following results are obtained after an identical time performance test and with the same filter efficiency: The porosity of the first zone decreases from 70% to about 50%, and the porosity of the second zone decreases from 50% to about 45%. Thus an overall porosity of 47.5% is obtained which is a considerable improvement in comparison to the overall porosity of only 38.3% that can be obtained by means of a conventional filter.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and soope of the invention are to be limited only by the terms of the appended claims.

We claim:

1. A process for manufacturing an exhaust gas filter for Diesel engines comprising a monolithic filter block made of a porous ceramic material having a plurality of ducts extending in the main flow direction of the exhaust gases from the inlet to the outlet of said filter, said ducts alternately being closed by plug means in order to force the passage of the exhaust gas through the duct walls, wherein the filter block is divided into zones, each zone having duct walls with decreased porosity from the previous zone in the main flow direction of the exhaust gases, and wherein additional plug means are arranged in the area of the border of the zones in such a way that the exhaust gas must flow through the duct walls of more than one zone as said gas flows from the inlet to the outlet of said filter, comprising the steps of: immersing a filter block blank with the largest desired porosity up to the desired zone border in a solution or suspension of a porosity-reducing agent; subsequently drying said filter block blank; immersion and drying process steps being repeated for producing additional zones; and providing the filter block blank with plug at the additional zone borders.

2. A process according to claim 1, wherein the filter block blank is immersed in a suspension made of cordierite which may also contain an inorganic binding agent, or into a water glass solutiqn.

3. A process according to claim 2, wherein a suspension or solution is used by means of which the porosity is reduced by 10 to 30% after the drying of the blank.

4. An exhaust gas filter for Diesel engines, comprising:
   a monolithic filter block made of a porous ceramic material, said block having a plurality of ducts extending in the main flow direction of the exhaust gases from an inlet to an outlet of said filter;
   said ducts alternately being closed by plug means for forcing the passage of the exhaust gas through duct walls;
   wherein said filter block is divided into zones, each zone having duct walls with decreased porosity from preceding zones in the main flow direction of said exhaust gases; and
   wherein additional plug means are arranged in an area of a border of each zone in such a way that said exhaust gas must flow through the duct walls of more than one zone as said gas flows from the inlet to the outlet of said filter.

5. An exhaust gas filter according to claim 4, wherein a zone has 90 to 70% of the porosity of the preceding zone.

6. An exhaust gas filter according to claim 5, wherein said filter has two to four zones.

7. An exhaust gas filter according to claim 4, wherein said filter has two to four zones.

8. An exhaust gas filter according to claim 4, wherein said filter has at least three said zone, said additional plug means being arranged between borders of adjacent said zones.

9. A process for manufacturing an exhaust gas filter for diesel engines comprising a monolithic filter block made of a porous ceramic material, said process comprising:
   immersing a filter block blank with a largest desired porosity up to a desired zone border to produce at least two zones of different porosities, said filter block blank being immersed in at least one of a solution and a suspension of porosity-reducing agent;
   drying said filter block blank; and
   inserting plugs in said filter block blank at said zone borders.

10. A process according to claim 9, wherein said immersing includes immersing said filter block blank in a suspension made of cordierite.

11. A process to claim 9, wherein said immersing including immersing said filter block blank in said suspension made of cordierite which contains an inorganic binding agent.

12. A process according to claim 11, wherein said immersing in said suspension reduces said porosity by 10 to 30% after the drying of the blank.

13. A process according to claim 9, wherein said immersing includes immersing said filter block blank in a water glass solution.

14. A process according to claim 13, wherein said immersing in said solution reduces the porosity by 10 to 30% after the drying of the blank.

15. A process according to claim 9, further comprising immersing said filter block at least one additional time, and drying said filter block blank at least one additional time to produce at least one additional zone of reduced porosity.

16. A process according to claim 9, further comprising immersing said filter block blank in at least one of a second suspension and a second solution that is different from said suspension and solution to produce at least one additional zone of reduced porosity.

* * * * *